United States Patent
Yamamoto et al.

(10) Patent No.: US 11,942,819 B2
(45) Date of Patent: Mar. 26, 2024

(54) CONTROL DEVICE

(71) Applicant: ADVICS CO., LTD., Kariya (JP)

(72) Inventors: Keisuke Yamamoto, Kariya (JP); Tomohisa Ozeki, Kariya (JP)

(73) Assignee: ADVICS CO., LTD., Kariya (JP)

( * ) Notice: Subject to any disclaimer, the term of this patent is extended or adjusted under 35 U.S.C. 154(b) by 13 days.

(21) Appl. No.: 17/909,770

(22) PCT Filed: Mar. 24, 2021

(86) PCT No.: PCT/JP2021/012238
§ 371 (c)(1),
(2) Date: Sep. 7, 2022

(87) PCT Pub. No.: WO2021/193716
PCT Pub. Date: Sep. 30, 2021

(65) Prior Publication Data
US 2023/0107732 A1   Apr. 6, 2023

(30) Foreign Application Priority Data
Mar. 27, 2020   (JP) .................................. 2020-057729

(51) Int. Cl.
*H02J 9/06*   (2006.01)

(52) U.S. Cl.
CPC .............. *H02J 9/068* (2020.01); *H02J 9/066* (2013.01); *H02J 2310/40* (2020.01)

(58) Field of Classification Search
CPC .... H02J 9/068; H02J 9/066; H02J 9/06; H02J 2310/40
See application file for complete search history.

(56) References Cited

U.S. PATENT DOCUMENTS

2011/0266106 A1   11/2011   Suzuki
2011/0316329 A1   12/2011   Nishino et al.

FOREIGN PATENT DOCUMENTS

| JP | 2003032399 A | 1/2003 |
| JP | 2010149798 A | 7/2010 |
| WO | 2010113574 A1 | 10/2010 |

OTHER PUBLICATIONS

International Search Report (PCT/ISA/210) with translation and Written Opinion (PCT/ISA/237) dated Jun. 8, 2021, by the Japanese Patent Office as the International Searching Authority for International Application No. PCT/JP2021/012238. (9 pages).

*Primary Examiner* — Robert L Deberadinis
(74) *Attorney, Agent, or Firm* — BUCHANAN INGERSOLL & ROONEY PC

(57) ABSTRACT

A control device includes an electric motor, a battery, a capacitor, a power source selection portion, a determination unit configured to determine whether the battery is normal, and a control unit configured to select, as a control mode of the electric motor, one of a first mode and a second mode in which a power consumption amount of the electric motor is reduced as compared to when the electric motor is driven in the first mode, and drive the electric motor in the selected control mode. When the battery is transitioned from a state of being determined to be normal to a state of being determined to be not normal, the control unit switches the control mode from the first mode to the second mode and then makes the power source selection portion select the capacitor.

2 Claims, 4 Drawing Sheets

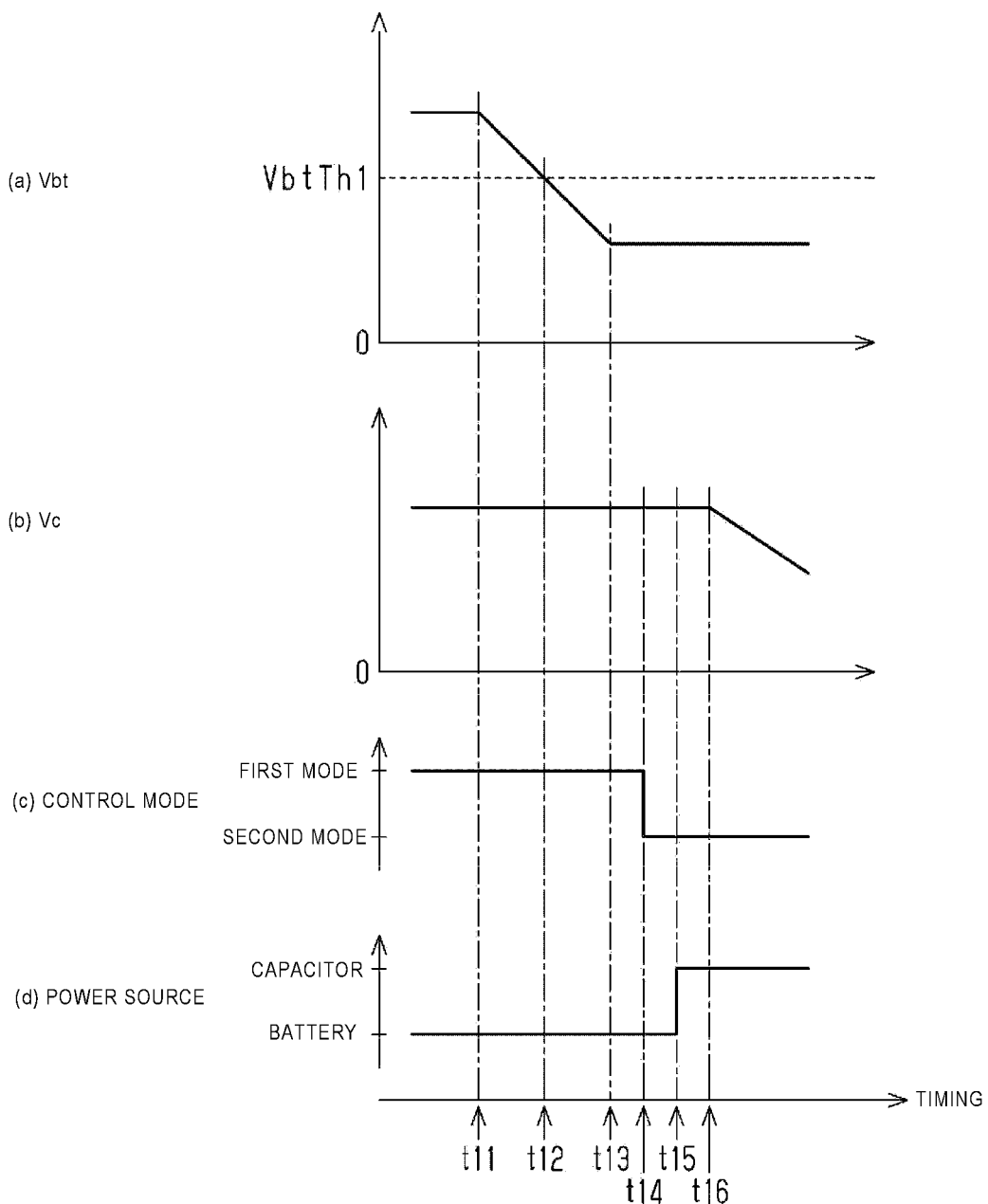

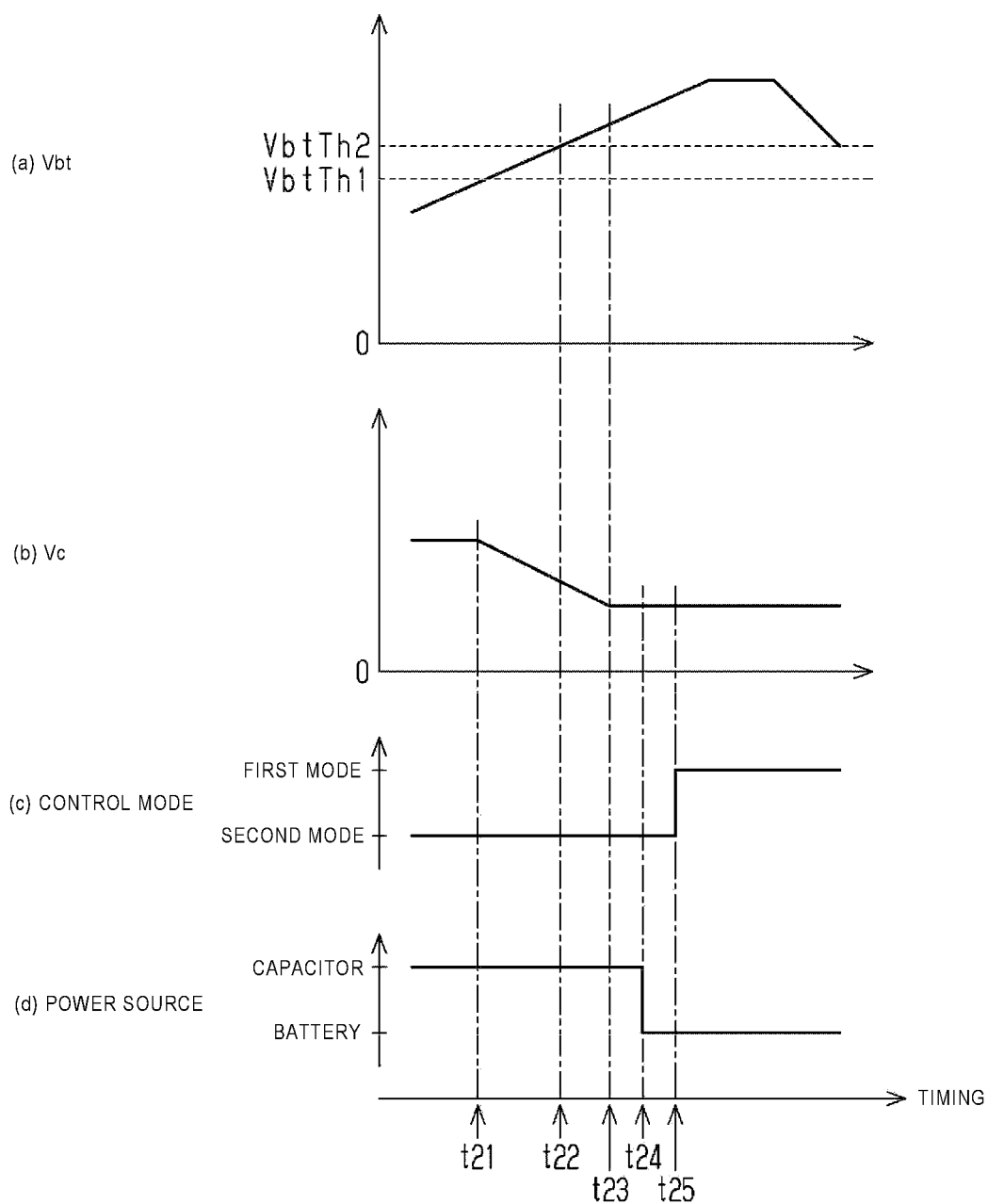

CONTROL DEVICE

TECHNICAL FIELD

The present disclosure relates to a control device for driving an actuator.

BACKGROUND ART

PTL 1 describes an example of a device including a main power source and a standby power source as a power supply source for supplying power to a memory. In this device, power is supplied from a power supply selected by a switching circuit to the memory.

CITATION LIST

Patent Literature

PTL 1: JP-A-2003-32399

SUMMARY

Technical Problem

A device including a main power source and a standby power source and driving an actuator by supplying power from either the main power source or the standby power source, uses a capacitor as the standby power source. A power supply amount of the capacitor is limited. Therefore, when the actuator is driven by power supply from the capacitor, it is desired to prevent a voltage of the capacitor from suddenly decreasing.

Solution to Problem

One aspect of a control device for solving the above problem includes an actuator; a battery; a capacitor; a power source selection portion configured to select one of the battery and the capacitor as a power supply source for the actuator; a determination unit configured to determine whether the battery is normal; and a control unit configured to select, as a control mode of the actuator, one of a first mode and a second mode in which a power consumption amount of the actuator is reduced as compared to when the actuator is driven in the first mode, and drive the actuator in the selected control mode, such that when the battery is determined to be normal, the battery is selected by the power source selection portion and the first mode is selected as the control mode, and when a state in which the battery is determined to be normal is transitioned to a state in which the battery is determined to be not normal, the control mode is switched from the first mode to the second mode, and then the capacitor is selected by the power source selection portion.

According to the above configuration, when the battery is determined to be not normal, the control mode of the actuator is switched to the second mode, and then the capacitor is selected by the power source selection portion. The first mode is a control mode in which the power consumption amount of the actuator is increased as compared to a case in which the actuator is driven in the second mode. According to the above configuration, when the actuator is driven in the first mode, the power supply from the capacitor to the actuator can be prevented. Therefore, a voltage of the capacitor can be prevented from suddenly decreasing.

One aspect of a control device for solving the above problem includes an actuator; a battery; a capacitor; a power source selection portion configured to select one of the battery and the capacitor as a power supply source for the actuator; a determination unit configured to determine whether the battery is normal; and a control unit configured to select, as a control mode of the actuator, one of a first mode and a second mode in which a power consumption amount of the actuator is reduced as compared to when the actuator is driven in the first mode, and drive the actuator in the selected control mode, such that when the battery is determined to be not normal, the capacitor is selected by the power source selection portion and the second mode is selected as the control mode, and when a state in which the battery is determined to be not normal is transitioned to a state in which the battery is determined to be normal, the battery is selected by the power source selection portion, and then the control mode is switched from the second mode to the first mode.

According to the above configuration, when the battery is determined to be normal, the battery is selected by the power source selection portion, and then the control mode of the actuator is switched to the first mode. Accordingly, when the actuator is driven in the first mode in which the power consumption amount of the actuator is increased, the power supply from the capacitor to the actuator can be prevented. Therefore, a voltage of the capacitor can be prevented from suddenly decreasing.

BRIEF DESCRIPTION OF DRAWINGS

FIG. 5 is a timing chart when a first mode is shifted to a second mode.

FIG. 6 is a timing chart when the second mode is shifted to the first mode.

DESCRIPTION OF EMBODIMENTS

Hereinafter, an embodiment of a control device will be described with reference to FIGS. 1 to 6.

Figure 1:
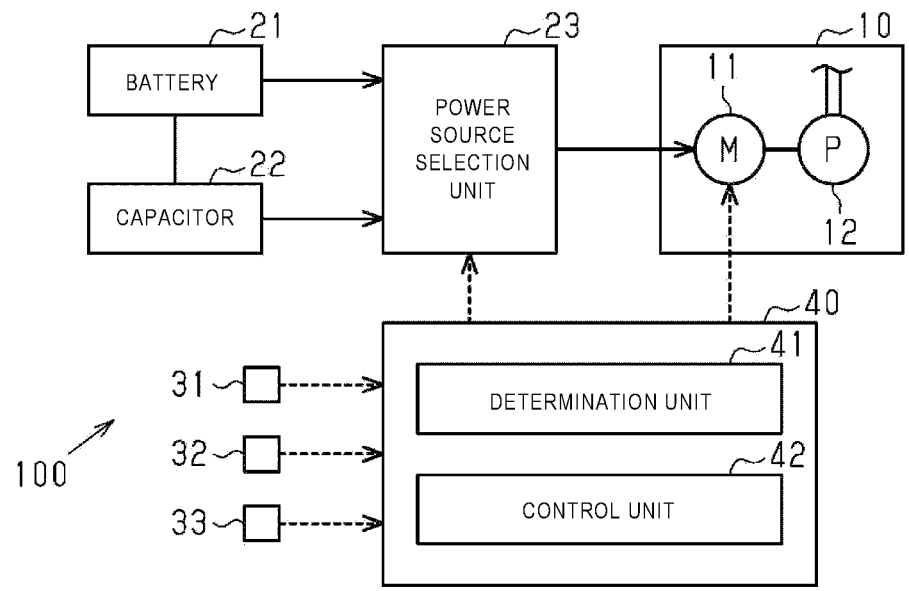
FIG. 1 is a diagram illustrating a schematic configuration of a control device according to an embodiment.

A control device 100 illustrated in FIG. 1 is an in-vehicle control device that adjusts a braking force of a vehicle. The control device 100 includes a braking device 10 and a controller 40 that controls the braking device 10. The braking device 10 includes an electric motor 11 which is an example of an actuator, and a pump 12 which supplies a brake fluid in accordance with driving of the electric motor 11.

The control device 100 is provided with a battery 21, a capacitor 22, and a power source selection portion 23. The battery 21 functions not only as a power supply source of the electric motor 11 of the braking device 10, but also as a power supply source of an actuator of another in-vehicle device. The battery 21 can be charged by, for example, electricity generation of an in-vehicle electrical generator.

The capacitor 22 can be charged by, for example, power supply from the battery 21. In the present embodiment, capacitance of the capacitor 22 is smaller than capacitance of the battery 21.

The power source selection portion 23 selects one of the battery 21 and the capacitor 22 as the power supply source of the electric motor 11, and operates to supply power from the selected power supply source to the electric motor 11. For example, the power source selection portion 23 includes at least one switching element.

According to the control device 100 of the present embodiment, the electric motor 11 is driven by the power supply from the power supply source, selected by the power source selection portion 23, of the battery 21 and the capacitor 22.

Detection signals are input to the controller 40 from various sensors. Examples of the sensor include a first voltage sensor 31, a second voltage sensor 32, and a third voltage sensor 33. The first voltage sensor 31 detects a battery voltage Vbt, which is a voltage of the battery 21, and outputs a signal corresponding to a detection result as a detection signal. The second voltage sensor 32 detects a capacitor voltage Vc, which is a voltage of the capacitor 22, and outputs a signal corresponding to a detection result as a detection signal. The third voltage sensor 33 detects an output voltage Vout, which is a voltage output from the power source selection portion 23, and outputs a signal corresponding to a detection result as a detection signal.

The controller 40 may have any one of the following configurations (a) to (c).

(a) The controller 40 includes one or more processors that execute various types of processing in accordance with a computer program. The processor includes a CPU and memories such as RAM and ROM. The memory stores a program code or a command configured to cause the CPU to execute the processing. The memory, that is, a computer readable medium includes any available medium that can be accessed by a general-purpose or dedicated computer.

(b) The controller 40 includes one or more dedicated hardware circuits that perform various types of processing. Examples of the dedicated hardware circuit include an integrated circuit for a specific application, that is, an application specific integrated circuit (ASIC) or a field programmable gate array (FPGA).

(c) The controller 40 includes a processor that executes a part of various types of processing according to a computer program, and a dedicated hardware circuit that executes the remaining processing of the various types of processing.

The controller 40 includes a determination unit 41 and a control unit 42 as functional units. The determination unit 41 determines whether the battery 21 is normal. The control unit 42 executes driving processing of the power source selection portion 23 and driving processing of the electric motor 11.

In the present embodiment, a first mode and a second mode are prepared as control modes for driving the electric motor 11. The first mode is a normal control mode. The second mode is a control mode in which a power consumption amount of the electric motor 11 is reduced as compared to when the electric motor 11 is driven in the first mode. The control unit 42 selects the first mode or the second mode based on a determination result of the determination unit 41. In the driving processing of the electric motor 11, the control unit 42 drives the electric motor 11 in the selected control mode.

Figure 2:
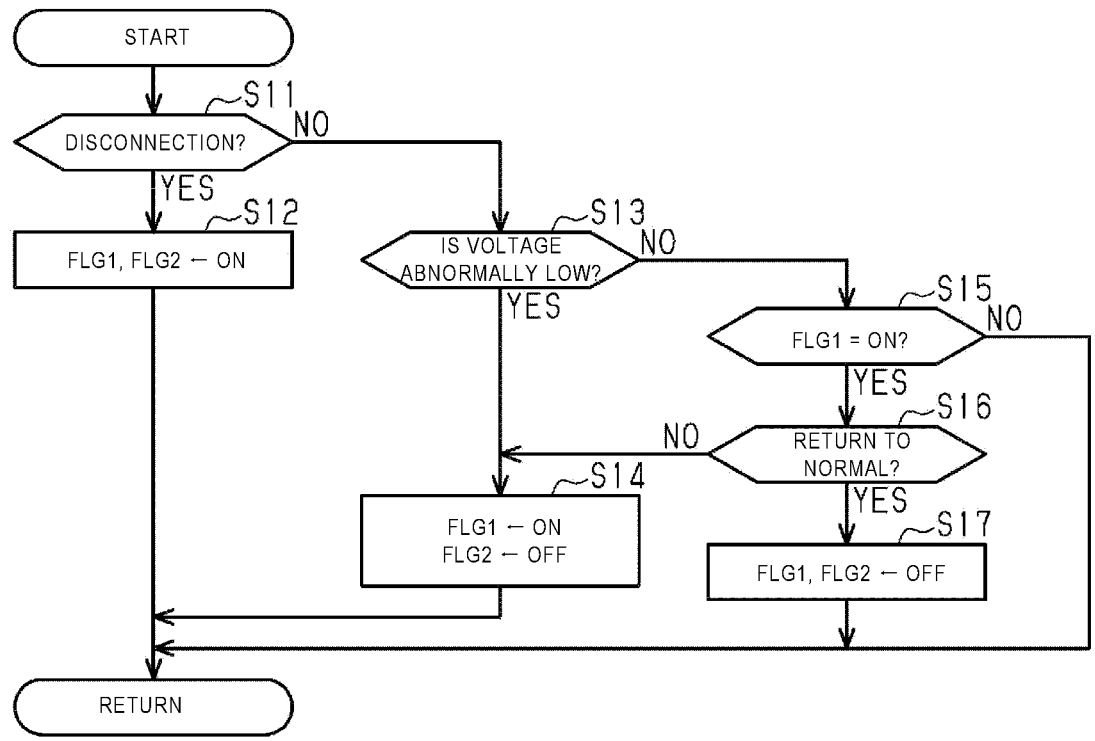
FIG. 2 is a flowchart illustrating a processing routine executed by a determination unit of the control device.

Next, with reference to FIG. 2, a processing routine executed by the determination unit 41 will be described. The present processing routine is repeatedly executed every predetermined control cycle.

In the present processing routine, in step S11, it is determined whether disconnection occurs in a power supply path from the battery 21 to the power source selection portion 23. In a case where the battery 21 is selected by the power source selection portion 23, when no disconnection occurs, the output voltage Vout is substantially the same as the battery voltage Vbt. On the other hand, when the disconnection occurs, the output voltage Vout deviates from the battery voltage Vbt. Therefore, for example, in the case where the battery 21 is selected by the power source selection portion 23, when a difference between the output voltage Vout and the battery voltage Vbt is less than a difference determination value, it is considered that no disconnection occurs. On the other hand, when the difference is equal to or larger than the difference determination value, it is considered that the disconnection occurs. When the capacitor 22 is selected by the power source selection portion 23, it is not possible to determine whether the disconnection has occurred in the power supply path, and therefore, it is considered that no disconnection occurs.

If it is determined that the disconnection occurs (S11: YES), the processing proceeds to the next step S12. In step S12, ON is set to both an abnormality flag FLG1 and a disconnection flag FLG2. The abnormality flag FLG1 is a flag in which OFF is set when the battery 21 is normal and ON is set when the battery 21 is not normal. The disconnection flag FLG2 is a flag in which ON is set when it is determined that the disconnection occurs in the power supply path from the battery 21 to the power source selection portion 23, and OFF is set when it is determined that the disconnection does not occur. The case in which the disconnection occurs is an example of a case in which the battery 21 is not normal. Therefore, when the disconnection flag FLG2 is set to ON, the abnormality flag FLG1 is also set to ON. Thereafter, the present processing routine is temporarily ended.

On the other hand, in step S11, if it is determined that the disconnection does not occur in the power supply path from the battery 21 to the power source selection portion 23 (NO), the processing proceeds to the next step S13. In step S13, it is determined whether the battery voltage Vbt is abnormally low. In the present embodiment, when the battery voltage Vbt is less than an abnormality determination voltage VbtTh1, it is considered that the battery voltage Vbt is abnormally low. On the other hand, when the battery voltage Vbt is equal to or higher than the abnormality determination voltage VbtTh1, the battery voltage Vbt is not regarded as abnormally low. In this case, a voltage sufficiently lower than a rated voltage of the battery 21 is set as the abnormality determination voltage VbtTh1.

If it is determined that the battery voltage Vbt is abnormally low (S13: YES), the processing proceeds to the next step S14. In step S14, the abnormality flag FLG1 is set to ON, and the disconnection flag FLG2 is set to OFF. That is, when the battery voltage Vbt is abnormally low, the battery 21 can be determined to be not normal even when no disconnection occurs in the power supply path from the battery 21 to the power source selection portion 23. Therefore, the abnormality flag FLG1 is set to ON even though the disconnection flag FLG2 is not set to ON. Thereafter, the present processing routine is temporarily ended.

On the other hand, in step S13, if it is determined that the battery voltage Vbt is not abnormally low (NO), the processing proceeds to the next step S15. In step S15, it is determined whether the abnormality flag FLG1 is set to ON. If the abnormality flag FLG1 is set to OFF (S15: NO), the battery 21 can be determined to be normal, and thus the present processing routine is temporarily ended without changing the flags FLG1 and FLG2. In this case, a state in which OFF is set for both of FLG1 and FLG2 is maintained. On the other hand, if the abnormality flag FLG1 is set to ON (S15: YES), the processing proceeds to the next step S16.

In step S16, it is determined whether the battery voltage Vbt has returned to normal. In the present embodiment, when the battery voltage Vbt is equal to or higher than a normal return voltage VbtTh2, it is considered that the battery voltage Vbt has returned to normal. On the other hand, when the battery voltage Vbt is less than the normal return voltage VbtTh2, it is considered that the battery voltage Vbt is not returned to normal. In this case, a voltage higher than the abnormality determination voltage VbtTh1 is set as the normal return voltage VbtTh2.

If it is determined that the battery voltage Vbt has not returned to normal (S16: NO), the processing proceeds to step S14 described above. That is, a state in which it is determined that the battery 21 is not normal is maintained. On the other hand, if it is determined that the battery voltage Vbt has returned to normal (S16: YES), the processing proceeds to the next step S17.

In step S17, both the abnormality flag FLG1 and the disconnection flag FLG2 are set to OFF. Then, the present processing routine is temporarily ended.

Figure 3:
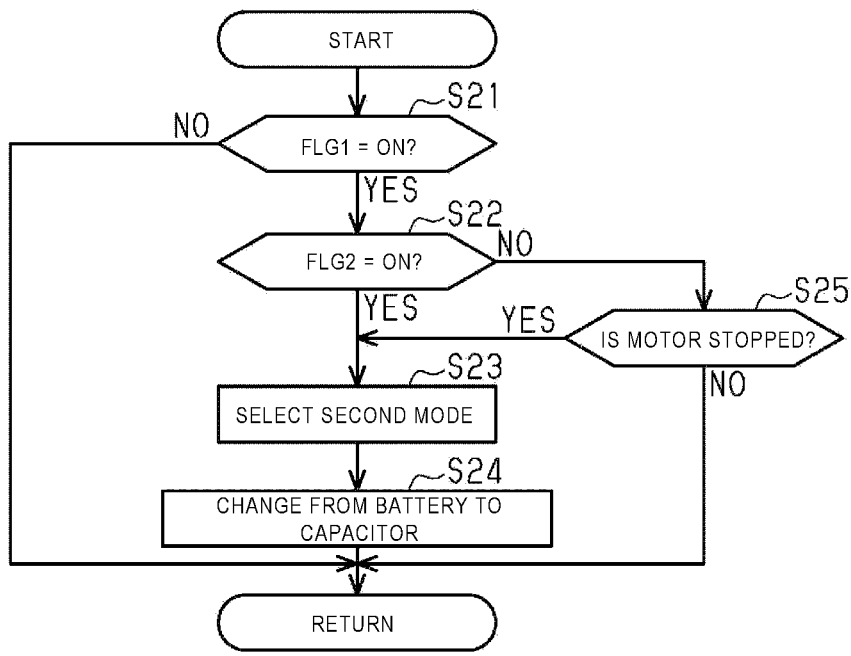
FIG. 3 is a flowchart illustrating a processing routine executed by a control unit of the control device.

Next, with reference to FIG. 3, a processing routine, which is executed by the control unit 42 to determine a timing of switching the control mode and changing the power supply source of the electric motor 11 in a situation in which the first mode is selected, will be described. The present processing routine is repeatedly executed while the first mode is selected.

In the present processing routine, in step S21, it is determined whether the abnormality flag FLG1 is set to ON. If the abnormality flag FLG1 is set to ON (S21: YES), the processing proceeds to the next step S22. In step S22, it is determined whether the disconnection flag FLG2 is set to ON. If the disconnection flag FLG2 is set to ON (S22: YES), the processing proceeds to the next step S23.

In step S23, the second mode is selected as the control mode. That is, the control mode is switched from the first mode to the second mode. Subsequently, in the next step S24, the power supply source of the electric motor 11 to be selected by the power source selection portion 23 is changed from the battery 21 to the capacitor 22. In the present embodiment, when a state in which the battery 21 is determined to be normal is transitioned to a state in which the battery 21 is determined to be not normal, the control mode is switched from the first mode to the second mode. After the control mode is switched, the power supply source of the electric motor 11 selected by the power source selection portion 23 is changed to the capacitor 22. Thereafter, the present processing routine is temporarily ended.

On the other hand, if the disconnection flag FLG2 is set to OFF in step S22 (NO), the processing proceeds to the next step S25. In step S25, it is determined whether the driving of the electric motor 11 is stopped. If the driving of the electric motor 11 is not stopped (S25: NO), the present processing routine is temporarily ended. On the other hand, if the driving of the electric motor 11 is stopped (S25: YES), the processing proceeds to step S23 described above. That is, when no disconnection of the battery 21 occurs, and the electric motor 11 is driven even though the battery 21 is determined to be not normal, both a state in which the first mode is selected as the control mode and a state in which the battery 21 is selected as the power supply source of the electric motor 11 are maintained. In this case, after the driving of the electric motor 11 is stopped, the control mode is switched (S23), and the power supply source of the electric motor 11 is changed (S24) in sequence.

On the other hand, in step 21, if the abnormality flag FLG1 is set to OFF (NO), the present processing routine is temporarily ended. That is, when the battery 21 is determined to be normal, both the state in which the first mode is selected as the control mode and the state in which the battery 21 is selected as the power supply source of the electric motor 11 are maintained.

Figure 4:
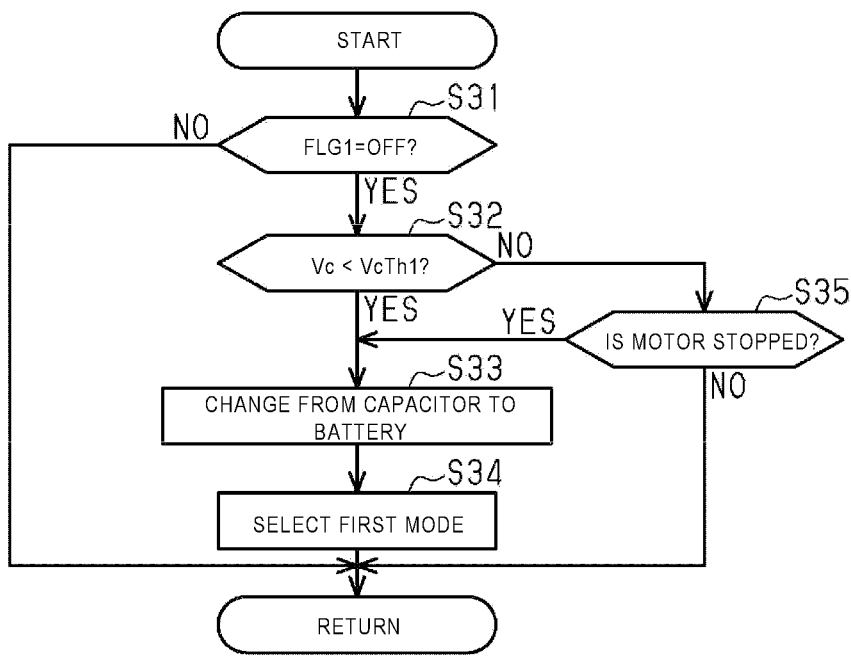
FIG. 4 is a flowchart illustrating a processing routine executed by the control unit.

Next, with reference to FIG. 4, a processing routine, which is executed by the control unit 42 to determine a timing of switching the control mode and changing the power supply source of the electric motor 11 in a situation in which the second mode is selected, will be described. The present processing routine is repeatedly executed while the second mode is selected.

In the present processing routine, in step S31, it is determined whether the abnormality flag FLG1 is set to OFF. If the abnormality flag FLG1 is set to OFF (S31: YES), the processing proceeds to the next step S32. In step S32, it is determined whether the capacitor voltage Vc is less than a switching determination capacitor voltage VcTh1. When the capacitor voltage Vc is less than the switching determination capacitor voltage VcTh1, it is considered that the capacitor voltage Vc is sufficiently low. On the other hand, when the capacitor voltage Vc is equal to or higher than the switching determination capacitor voltage VcTh1, it is considered that electric charges are still accumulated in the capacitor 22. For example, by setting a value close to "0" as the switching determination capacitor voltage VcTh1, it is possible to determine whether the capacitor voltage Vc is substantially "0". If the capacitor voltage Vc is less than the switching determination capacitor voltage VcTh1 (S32: YES), the processing proceeds to the next step S33.

In step S33, the power supply source of the electric motor 11 to be selected by the power source selection portion 23 is changed from the capacitor 22 to the battery 21. Subsequently, in the next step S34, the first mode is selected as the control mode. In the present embodiment, when a state in which the battery 21 is determined to be not normal is transitioned to a state in which the battery 21 is determined to be normal, the power supply source of the electric motor 11 selected by the power source selection portion 23 is changed to the battery 21. After the power supply source of the electric motor 11 is changed, the control mode is switched from the second mode to the first mode. Thereafter, the present processing routine is temporarily ended.

On the other hand, in step S32, if the capacitor voltage Vc is equal to or higher than the switching determination capacitor voltage VcTh1 (NO), the processing proceeds to the next step S35. In step S35, it is determined whether the driving of the electric motor 11 is stopped. If the driving of the electric motor 11 is not stopped (S35: NO), the present processing routine is temporarily ended. On the other hand, if the driving of the electric motor 11 is stopped (S35: YES), the processing proceeds to step S33 described above. That is, when the capacitor voltage Vc is equal to or higher than the switching determination capacitor voltage VcTh1, even though the battery 21 is determined to be normal, during the driving of the electric motor 11, both the state in which the second mode is selected as the control mode and the state in which the capacitor 22 is selected as the power supply source of the electric motor 11 are maintained. After the driving of the electric motor 11 is stopped, the power supply source of the electric motor 11 is changed (S33) and the control mode is switched (S34) in sequence.

On the other hand, in step 31, if the abnormality flag FLG1 is set to ON (NO), the present processing routine is temporarily ended. That is, when the battery 21 is determined to be not normal, both the state in which the second mode is selected as the control mode and the state in which the capacitor 22 is selected as the power supply source of the electric motor 11 are maintained.

Functions and effects of the present embodiment will be described.

First, with reference to FIG. 5, a case will be described in which the battery 21 is transitioned from the state of being determined to be normal to the state of being determined to be not normal.

As illustrated in (a), (b), (c) and (d) of FIG. 5, when the electric motor 11 is driven in the first mode from a timing t11, since the battery 21 is selected as the power supply source of the electric motor 11, the battery voltage Vbt starts to decrease. In an example illustrated in FIG. 5, from a timing t12, the battery voltage Vbt is less than the abnormality determination voltage VbtTh1, and the abnormality flag FLG1 is set to ON. That is, the state in which the battery 21 is determined to be normal is transitioned to the state in which the battery 21 is determined to be not normal.

However, the electric motor 11 is driven until a timing t13. Therefore, even though the battery 21 is determined to be not normal, the driving of the electric motor 11 in the first mode is continued, and the state in which the battery 21 is selected as the power supply source of the electric motor 11 is continued.

When the driving of the electric motor 11 is stopped at the timing t13, the control mode of the electric motor 11 is switched from the first mode to the second mode at a subsequent timing t14. In this way, at a timing t15 after the second mode is selected as the control mode, the power supply source of the electric motor 11 selected by the power source selection portion 23 is changed from the battery 21 to the capacitor 22. Then, when the driving of the electric motor 11 is instructed at a subsequent timing t16, the electric motor 11 is driven in the second mode by power supply from the capacitor 22.

Here, the first mode is a mode in which the power consumption amount of the electric motor 11 is larger as compared to when the electric motor 11 is driven in the second mode. Therefore, when the electric motor 11 is driven in the first mode in a situation in which the capacitor 22 is selected by the power source selection portion 23, the power consumption amount of the electric motor 11 is large, and thus the capacitor voltage Vc rapidly decreases.

In contrast, in the present embodiment, after the second mode is selected in which the power consumption amount of the electric motor 11 is reduced, the capacitor 22 is selected as the power supply source of the electric motor 11. Accordingly, when the electric motor 11 is driven in the first mode in which the power consumption amount of the electric motor 11 is large, the power supply from the capacitor 22 to the electric motor 11 can be prevented. Therefore, the capacitor voltage Vc can be prevented from suddenly decreasing.

Incidentally, since the disconnection of the battery 21 occurs, the battery 21 may be determined to be not normal. When the disconnection occurs in the battery 21, the battery 21 cannot supply power to the electric motor 11. Therefore, when it is determined that the disconnection occurs in the battery 21, during the driving of the electric motor 11, the control mode is switched from the first mode to the second mode. The power supply source of the electric motor 11 is changed from the battery 21 to the capacitor 22. Accordingly, even though the battery 21 cannot supply power to the electric motor 11 due to the occurrence of the disconnection, the driving of the electric motor 11 can be continued. Furthermore, in this case, the electric motor 11 is driven in the second mode. Therefore, as compared to the case in which the driving of the electric motor 11 in the first mode is continued, the time during which the electric motor 11 is driven can be lengthened.

Next, with reference to FIG. 6, a function and an effect in a case will be described in which the battery 21 is transitioned from the state of being determined to be not normal to the state of being determined to be normal. In an example illustrated in FIG. 6, while the capacitor 22 is selected as the power supply source of the electric motor 11, the battery 21 is charged by electricity generation of the electrical generator of the vehicle and the like.

As illustrated in (a), (b), (c) and (d) of FIG. 6, the driving of the electric motor 11 is started at a timing t21 when the battery voltage Vbt rises due to charging. In this case, since the battery 21 is determined to be not normal, the electric motor 11 is driven in the second mode by the power supply from the capacitor 22. Then, the capacitor voltage Vc gradually decreases. At a timing t22 during the driving of the electric motor 11 in the second mode, the battery voltage Vbt is equal to or higher than the normal return voltage VbtTh2, and it is determined that the battery voltage Vbt has returned to normal. That is, the state in which the battery 21 is determined to be not normal is transitioned to the state in which the battery 21 is determined to be normal.

However, the electric motor 11 is driven until a timing t23. Therefore, even though the battery 21 is determined to be normal, the state in which the capacitor 22 is selected as the power supply source of the electric motor 11 is continued, and the driving of the electric motor 11 in the second mode is continued.

When the driving of the electric motor 11 is stopped at the timing t23, the power supply source of the electric motor 11 is changed from the capacitor 22 to the battery 21 at a subsequent timing t24. In this way, at a timing t25 after the battery 21 is selected as the power supply source, the control mode of the electric motor 11 is switched from the second mode to the first mode. Then, when the driving of the electric motor 11 is instructed thereafter, the electric motor 11 is driven in the first mode by the power supply from the battery 21.

In the present embodiment, after the battery 21 is selected as the power supply source of the electric motor 11, the first mode in which the power consumption amount of the electric motor 11 is large is selected. Accordingly, when the electric motor 11 is driven in the first mode, the power supply from the capacitor 22 to the electric motor 11 can be prevented. Therefore, the capacitor voltage Vc can be prevented from suddenly decreasing.

Incidentally, when the electric motor 11 is driven in the second mode, the capacitor voltage Vc may be less than the switching determination capacitor voltage VcTh1. In this case, the capacitor voltage Vc is extremely low, and a power supply amount from the capacitor 22 to the electric motor 11 may not be sufficiently secured during the driving of the electric motor 11 in the second mode.

Therefore, in the present embodiment, when the capacitor voltage Vc is less than the switching determination capacitor voltage VcTh1 in a situation in which the electric motor 11 is driven in the second mode, during the driving of the electric motor 11, the power supply source of the electric motor 11 is changed from the capacitor 22 to the battery 21. Accordingly, the power supply amount to the electric motor 11 can be prevented from being unable to be secured during the driving of the electric motor 11, and thus the driving of the electric motor 11 can be prevented from being interrupted.

The above embodiment can be modified and implemented as follows. The above embodiment and the following modification can be implemented in combination with each other as long as the embodiment and the modification are technically not in conflict with each other.

In a situation in which the battery 21 is determined to be normal, when the battery voltage Vbt is lower than the capacitor voltage Vc, the battery 21 may be determined to be not normal. When a value obtained by subtracting the battery voltage Vbt from the capacitor voltage Vc is equal to or larger than a determination value, the battery 21 may be determined to be not normal.

The determination as to whether the battery voltage Vbt has returned to normal may be changed as follows. For example, when the battery voltage Vbt is higher than the capacitor voltage Vc, it may be determined that the battery voltage Vbt has returned to normal. When a value obtained by subtracting the capacitor voltage Vc from the battery voltage Vbt is equal to or larger than a return determination value, it may be determined that the battery voltage Vbt has returned to normal.

In the above embodiment, in a case where the battery 21 is transitioned from the state of being determined to be not normal to the state of being determined to be normal, when the capacitor voltage Vc is less than the switching determination capacitor voltage VcTh1, even during the driving of the electric motor 11, the power supply source of the electric motor 11 is changed to the battery 21, and then the control mode is switched to the first mode. However, the disclosure is not limited thereto. For example, during the driving of the electric motor 11, the power supply source of the electric motor 11 is changed to the battery 21, whereas the state of selecting the second mode as the control mode may be maintained. In this case, it is preferable that the control mode is switched to the first mode after the driving of the electric motor 11 is stopped.

In a case where the battery 21 is transitioned from the state of being determined to be not normal to the state of being determined to be normal, even though the capacitor voltage Vc is equal to or higher than the switching determination capacitor voltage VcTh1, during the driving of the electric motor 11, the power supply source of the electric motor 11 may be changed from the capacitor 22 to the battery 21. Furthermore, during the driving of the electric motor 11, the control mode may be switched from the second mode to the first mode after the power supply source of the electric motor 11 is changed to the battery 21. On the contrary, the state in which the second mode is selected as the control mode may be continued until the driving of the electric motor 11 is stopped. In this case, it is preferable that the control mode is switched from the second mode to the first mode after the driving of the electric motor 11 is stopped.

In a case where the battery 21 is transitioned from the state of being determined to be normal to the state of being determined to be not normal, the control mode may be switched to the second mode during the driving of the electric motor 11 even when no disconnection occurs in the battery 21. Furthermore, during the driving of the electric motor 11, the power supply source of the electric motor 11 may be changed to the capacitor 22. On the contrary, the state in which the battery 21 is selected as the power supply source of the electric motor 11 may be continued until the driving of the electric motor 11 is stopped. In this case, it is preferable to change the power supply source of the electric motor 11 from the battery 21 to the capacitor 22 after the driving of the electric motor 11 is stopped.

In a case where the battery 21 is determined to be not normal due to the determination that the disconnection occurs in the battery 21, the power supply source of the electric motor 11 may be changed to the capacitor 22 before the control mode is switched. In this case, it is preferable that the control mode is immediately switched to the second mode after the power supply source is changed to the capacitor 22.

As the capacitor 22, a capacitor having a capacity equal to that of the battery 21 may be used, or a capacitor having a capacity larger than the battery 21 may be used.

The actuator driven by the power supply from one of the battery 21 and the capacitor 22 may be an in-vehicle actuator other than the electric motor 11 of the braking device 10. For example, the actuator may be an electromagnetic valve of the braking device 10 or an actuator of an in-vehicle steering device. The actuator may be a driving motor for a power window.

The control device may not be an in-vehicle device.

Next, technical ideas that can be understood from the above embodiment and modification will be described.

(A) A controller applied to the above control device including:
the determination unit and the control unit.

The invention claimed is:

1. A control device, comprising:
an actuator;
a battery;
a capacitor;
a power source selection portion configured to select one of the battery and the capacitor as a power supply source for the actuator;
a determination unit configured to determine whether the battery is normal; and
a control unit configured to select, as a control mode of the actuator, one of a first mode and a second mode in which a power consumption amount of the actuator is reduced as compared to when the actuator is driven in the first mode, and drive the actuator in the selected control mode, such that when the battery is determined to be normal, the battery is selected by the power source selection portion and the first mode is selected as the control mode, and when a state in which the battery is determined to be normal is transitioned to a state in which the battery is determined to be not normal, the control mode is switched from the first mode to the second mode, and then the capacitor is selected by the power source selection portion.

2. A control device, comprising:
an actuator;
a battery;
a capacitor;
a power source selection portion configured to select one of the battery and the capacitor as a power supply source for the actuator;
a determination unit configured to determine whether the battery is normal; and
a control unit configured to select, as a control mode of the actuator, one of a first mode and a second mode in which a power consumption amount of the actuator is reduced as compared to when the actuator is driven in the first mode, and drive the actuator in the selected control mode, such that when the battery is determined to be not normal, the capacitor is selected by the power source selection portion and the second mode is selected as the control mode, and when a state in which the battery is determined to be not normal is transitioned to a state in which the battery is determined to be normal, the battery is selected by the power source selection portion, and then the control mode is switched from the second mode to the first mode.

\* \* \* \* \*